Patented Dec. 4, 1945

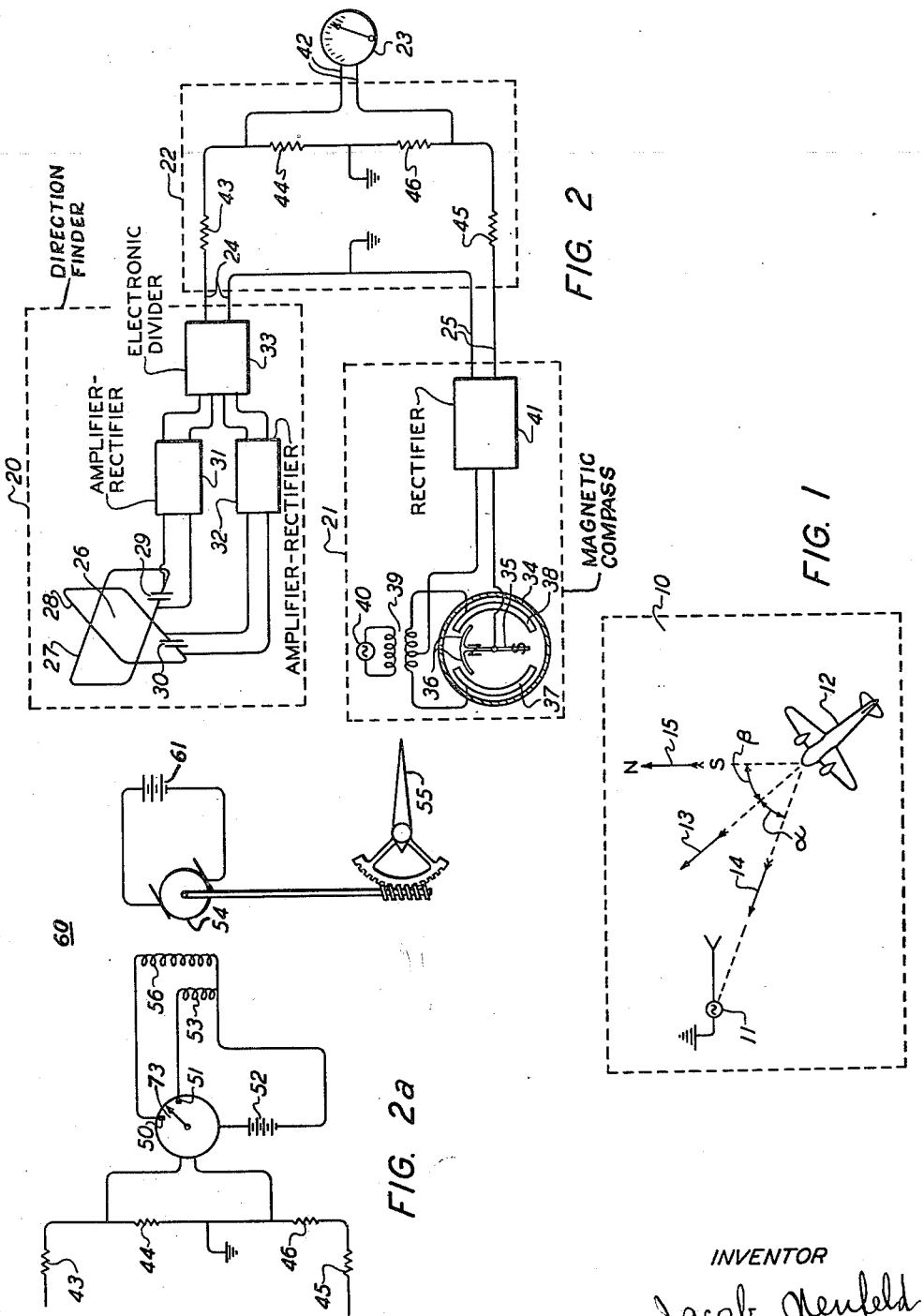

2,390,383

UNITED STATES PATENT OFFICE 2,390,383

NAVIGATIONAL METHOD AND APPARATUS

Jacob Neufeld, Tulsa, Okla.

Application June 16, 1942, Serial No. 447,240

6 Claims. (Cl. 250—11)

My invention relates to radio navigation devices in which radio and earth compass bearings may be indicated on a single device. The invention further relates to a device for automatically indicating position of a craft from resultant bearings.

The navigator of an aircraft may require information of the heading of the craft with respect to north. This is usually obtained from an earth compass of the earth inductor or magnetic type, or a directional gyro. Information is also employed which is obtained from a radio compass. In general, such radio compasses indicate the direction of a radio transmitter with respect to the longitudinal axis of the aircraft, or the direction of the craft with respect to the transmitter. It is generally necessary to convert this information into bearings determined by reference to north by adding algebraically the earth heading and the radio compass heading.

If the aircraft is moving at high velocity, the time required to make calculations or conversions may correspond to a movement of the order of 3 to 4 miles per minute. It is, therefore, desirable to supply the information not only as directly and quickly as possible, but to also collect the information on a single instrument whereby the operator of the craft may avoid the inconvenience of observing a plurality of different instruments.

An object of the instant invention is to provide means for the navigation of aircraft and other mobile vehicles in which navigational data is quickly indicated on a single device. An additional object is to provide means for algebraically combining radio compass and earth compass headings whereby a radio bearing is indicated.

According to a well known navigational method the position of a craft may be determined by observing and plotting on the chart the bearings of two fixed transmitting stations located on the ground. Each bearing gives a position line, i. e., a line along which the plane's position is known to be. The intersection of these lines gives a definite position or fix.

My invention utilizes the well known method of finding the position of a craft by determining the bearings i. e., directions of determined objects from the craft. According to the well accepted terminology the bearings are called true or magnetic when the directions are referred to the geographical or to the magnetic pole, and the bearings are called relative when they are referred to the fore-and-aft line of the ship.

There are a number of known means for producing bearings among these being the magnetic compass, directional gyroscope and radio direction finder. The radio direction finders are of the homing type or of the type provided with an angular scale and indicating automatically and continuously the directions of transmitting stations to which the receiver is tuned. The first type, i. e., the homing type apprises the pilot only whether or not he is pointing to a transmitting station while the second type of the direction finder gives to the pilot the direction of the transmitting station with respect to the fore-and-aft axis. It is, however, apparent that such an indication is not always useful for determining the position of the craft, since it indicates the relative bearing with respect to the fore-and-aft axis, while it is desirable in many circumstances to determine the absolute bearing of the transmitting station with respect to the north direction.

In order to convert the relative bearing indicated by the direction finder into a true bearing, it becomes necessary to refer to the earth compass heading. Devices have been proposed in which the earth compass card is associated with the radio compass indicator so that the radio bearings with respect to a meridian may be obtained. In such devices it is difficult to use repeaters so that more than one indicator may be located at different positions on the craft and operated by a single earth and radio compass. Furthermore, it is difficult to directly indicate position by observing successively two or more radio bearings.

It is, therefore, the object of my invention to combine the indication of the relative bearing with the indication of the earth compass and to produce an indication of the true bearing of a ground transmitting station as determined from a mobile station.

It is a further object of my invention to provide a circuit arrangement or mechanical structure for automatically maintaining an aircraft on a predetermined course of flight.

One of the objects of my invention is to provide a circuit arrangement for automatically controlling the course of aircraft in flight between two or more prearranged positions with means for automatically restoring the aircraft to the proper course in the event of any tendency of departure from such prearranged course.

Still another object of my invention is to provide an arrangement of control mechanism for guiding aircraft according to a directively propagated beam having means for correspondingly controlling the position of the aircraft rudder whereby the rudder may be maintained in a position which will set the course for the aircraft and will be automatically adjusted to maintain the aircraft on a predetermined course irrespective of conditions tending to deviate the aircraft from the course.

A further object of my invention is to provide a circuit arrangement for a precision control mechanism for guiding aircraft according to a directively propagated beam of radio frequency energy having means for controlling the angular position of the rudder of the aircraft in differential relation to the deviation of the aircraft from the prearranged course.

My invention is directed to a system for automatically guiding an aircraft and for maintaining the aircraft along a prearranged course of flight determined by a directively propagated radio frequency beam. Accidents due to the failure of pilots to properly follow the directively propagated beam may be avoided in the system of my invention by eliminating the human element which may introduce sources of error in the reading of indicators or in observing received beam signals. In addition to visual observing means, I provide an automatic control for directly maintaining the rudder of the aircraft on the course defined by the directively propagated beam. Under changes in wind conditions, the tendencies which exist for deviating an aircraft from the predetermined course produce no detrimental effect in the system of my invention.

My invention will be better understood with reference to the drawing in which:

Fig. 1 shows diagrammatically a portion of the space including a fixed transmitter located on the ground and an aircraft flying in the neighborhood of the transmitter.

Fig. 2 shows an indicating apparatus located on the craft.

Fig. 2a shows a modification of my invention in which the indicating apparatus is being used in conjunction with an automatic steering device.

Referring now more particularly to Fig. 1, numeral 10 designates an area including a fixed transmitting station 11 located on the ground, and airplane 12 heading in the direction indicated by an arrow 13. The direction at which the transmitting station is located is indicated by an arrow 14 and the north direction is indicated by an arrow 15. The craft is provided with a radio direction finder tuned to the station 11 and which automatically and continuously indicates the angle which I shall hereafter designate as relative bearing of the transmitting station 11. This relative bearing is determined by the angle α between the direction 14 of the transmitting station and the direction 13 of the fore-and-aft axis. The airplane is also provided with an earth compass which may be of magnetic, gyroscopic, induction or any other type and which is adapted to indicate the angle β between the directions indicated by the arrows 13 and 15. I shall further designate as true bearing the angle between the direction of the transmitting station 11, the said direction being indicated by the arrow 14 and the direction of the north indicated by the arrow 15. It is apparent that the true bearing of the station is represented by the angle α+β and accordingly I am providing in the craft an instrument in which the values α and β are first separately determined and then combined into an algebraic sum, such an algebraic sum designating the true bearing.

The instrument located on the craft is shown diagrammatically in Fig. 2 and consists of three component parts included in dotted rectangles 20, 21 and 22 respectively, and of an indicator 23. The rectangle 20 includes a direction finder responsive to waves derived from the transmitting station 11 and delivering across the output terminals 24 a voltage representing the angular value α between the axis of the craft designated by the arrow 13 and the direction of the transmitting station designated by the arrow 14. The rectangle 21 includes a magnetic compass and delivers across the output terminals 25 a voltage representing the angular value β between the axis of the craft designated by the arrow 13 and the north direction designated by the arrow 15. The rectangle 22 includes an electrical circuit receiving from its input terminals 24 and 25 voltages representing the angles α and β respectively and delivering across its output terminals 42 a voltage representing the algebraic sum of the input voltages, i. e., the value α+β. The value α+β is being indicated by the meter 23 and represents the true bearing, i. e., the angle between the direction of the transmitting station and the direction of the north.

Referring now more specifically to the block 20 the numeral 26 represents a directional aerial comprising two vertical antenna loops 27 and 28. The loops 27 and 28 are fixedly mounted on the plane.

The loops are tuned by means of condensers 29 and 30 respectively and have their outputs connected to amplifier rectifiers 31 and 32 respectively. The amplifier rectifiers are connected to an electronic divider 33 which may be of the type described in my U. S. Patent 2,129,880.

In order to understand the operation of the arrangement contained in the rectangle 20 assume that the transmitting station 11 is located in a plane bisecting the angle between the planes of the loops 27 and 28. It will be apparent that the relative positions of the transmitting station with respect to both loops are similar one to another, and, consequently, the amount of energy received from the transmitter will be the same for the loop 27 as for the loop 28. Then the amplifier rectifiers 31 and 32 will consequently deliver equal voltages to the electronic divider 33 and the voltage at the output of the electronic divider will have the magnitude representing the value of the ratio equal to one.

It is obvious that with the arrangement as described the responsiveness of the two antennas remains equal as long as the airplane is headed directly along the line in the bisecting plane and the value of the ratio across the terminals will be one. It should, however, be noted that the loops 27 and 28 are fixedly mounted on the plane, and, therefore, any change in the heading of the plane 12, i. e., the change in the direction of the arrow 13 will change the relative position of the loops 27, 28 with respect to the transmitting station and will cause an increase in the responsiveness in one of the loops and a corresponding decrease in the other loop. In that connection it is important to note that the ratio of responsiveness of the two loops remains constant for any given value α irrespective of the signal strength or distance from the station. Consequently, the output voltage of the electronic divider 33 representing the ratio of signals derived from loops 27, 28 also represents the angle α between the directions indicated by the arrows 13 and 14 respectively.

Referring now more specifically to the block 21 the numeral 34 indicates a compass bowl which may be filled with a liquid such as having varmolene, kerosene or other suitable liquid, preferably one having high dielectric properties. Pivotally mounted in said bowl and centrally located therein is a magnetic needle 35. The compass bowl 34 is fixedly attached with respect to the fore and aft (longitudinal) axis of the craft. A compass card (not shown) may fixedly be mounted on the compass bowl to indicate relative displacements between the needle and the compass bowl the said relative displacement indicating the orientation of the longitudinal axis of the craft with respect to the earth's magnetic field.

At the one end of needle 35 is attached a plate 36 which is adapted for relative movement with respect to plates 37 and 38 respectively, said last mentioned plates being fixedly attached with respect to the compass bowl in a diametrically opposed relation.

Plates 36, 37, 38 may be of copper or any other suitable conducting material and arranged so that plates 36, 37 and the plates 36, 38 form two electrical condensers respectively, both condensers having the liquid as a dielectric therebetween. Thus the capacity of each of the condensers is adapted to be varied by relative motion between plates 36 and 37, 38 produced by the relative motion between the compass bowl and compass needle. A transformer 39 is being provided, the primary winding of which is connected to a source of A. C. current 40 and the secondary winding of which has its terminals connected to the plates 37 and 38 respectively. The midpoint of the secondary winding of the transformer and the magnet 35 are respectively connected to the input terminals of a rectifier 41. The output terminals of the rectifier are designated by 25.

The liquid is of such viscosity as to secure the desired damping of the oscillations of the magnetic needle and of such character that it does not act as a conductor of electricity or tend to cause the deterioration of the needle by chemical action because of their direct contact with the liquid.

It is apparent that the voltage across the output terminals 25 of the rectifier and derived from the A. C. source 40 depends among other things upon the parameters of the electrical network contained between the source 40 and the terminals 25. It is noted that some of the parameters vary and their value depends upon the position of the magnetic needle 35 with respect to the bowl. It is obvious that the magnetic needle 35 and the plate 36 will tend to assume a fixed position with respect to the earth. This is because the magnetic needle 35 will be subject to a force derived from the earth magnetic field and will continually tend to be oriented in the direction of the magnetic north. On the other hand, the plates 37, 38 fixedly mounted with respect to the longitudinal axis of the craft will change their position with respect to the plate 36 when the orientation of the craft with respect to the magnectic north changes. Consequently, the capacity of the condensers formed by the plates 36, 37 and 36, 38 respectively is a function of the orientation of the craft with respect to the magnetic north. The relative movement between plates 36 and 37, 38 increases or decreases the amount of liquid dielectric between the plates whereby the capacity of the condenser is varied in accordance therewith. The parameters of the circuit have been so chosen that within a given range the voltage across the terminals 25 is substantially proportional to the angular value representing the direction of the magnet with respect to the bowl. Consequently, I have provided in the block 21 an arrangement giving across the output terminals 25 a voltage representing the angle $\beta$ between the course of the craft indicated by the arrow 13, and the direction of north, indicated by the arrow 15.

The electrical circuit included in the block 22 is adapted to receive across its input terminals 24 and 25 voltages representing the angles $\alpha$ and $\beta$ respectively and to produce across the output terminals 42 the voltage representing the angle $\alpha+\beta$. As shown in the figure, one of the output terminals 24 is connected to the ground directly and the other output terminals is connected to the ground through a resistor 43 and a resistor 44. In a similar manner one of the output terminals 25 is connected to the ground directly and the other of said output terminals is connected to the ground through a resistor 45 and a resistor 46. The resistors 44, 46 possess a common terminal connected to the ground and have other two terminals connected to the voltmeter 23. The values of the resistors 43 and 44 have been so selected that the voltage across the resistor 44 has been made to be substantially proportional to the voltage applied across the terminals 24 and representing the angle $\alpha$. In a similar manner the values of the resistors 45 and 46 have been so selected that the voltage across the resistor 46 has been made to be substantially proportional to the voltage applied across the terminals 25 and representing the angle $\beta$. The resistors 44 and 46 are mounted in series so as to add the voltages across their terminals and, consequently, the voltage across the terminals 42 and indicated by 23 represent the algebraic sum of the angular values $\alpha$ and $\beta$.

It is, therefore, apparent that I have provided a means for indicating absolute bearings, the absolute bearings being designated above by angular values $\alpha+\beta$.

By means of the above-described arrangement a very simple means is provided, whereby the airplane may be automatically steered in a given direction, in conjunction with an automatic directional steering device well known in the art. This may be effected, for instance, by connecting the leads 42 of the instrument shown in Fig. 2 to an automatic directional steering device shown diagrammatically in Fig. 2a.

Referring now more particularly to Fig. 2a. There is shown a modification of Fig. 2 in which elements which are common to both figures are designated by the same numerals. In particular the steering mechanism of Fig. 2a is provided with an instrument 73 which is structurally similar to the indicating instrument 23 of Fig. 2 but possesses in addition two fixed terminals 50 and 51. The instrument 73 of Fig. 2a consists of a fixed circular scale and of a needle pivoted at the center of the scale and adapted to be rotated in response to the voltage derived from the terminals 42, the said voltage indicating the value $\alpha+\beta$ referred to in the preceding paragraphs. The purpose of the instrument shown in Fig. 2a consists in controlling automatically the steering of the craft in such a manner so as to maintain automatically the true bearing of the craft represented by the value $\alpha+\beta$ within two sufficiently close limits, the upper limit being designated by the value $(\alpha+\beta)_{max}$ and the lower limit being designated by the value $(\alpha+\beta)_{min}$. The control of the airplane is being effected by means of a rudder 55 which is adapted to be rotated in one or in the opposite direction by means of a D. C. motor 60. The motor 60 consists of an armature 54 supplied with current from a battery 61 and of two separate excitation windings 53 and 56 wound in opposite directions in such a manner that when a D. C. current is made to pass the winding 53 and the winding 56 is deenergized, the armature 54 of the motor rotates in a given direction, and when a D. C. current is made to pass through the winding 56 instead of the winding 53, the armature 54 rotates in the opposite direction. Either of the windings 53, 56 is energized by means of a battery 52. As shown in Fig. 2a the battery 52 has one of its terminals connected to the needle of the instrument 23 and has the other terminal connected to a common terminal of the windings 53 and 56, the other terminals of the windings 53 and 56 being respectively connected to the terminals 51 and 50. The terminals 50 and 51 are secured to the scale of the instrument 23 at such positions that when the true bearing of the aircraft attains the value $(\alpha+\beta)_{max}$ the needle of the instrument 23 contacts the terminal 51 and when the true bearing of the aircraft attains the value $(\alpha+\beta)_{min}$, the needle contacts the terminal 50, and for any intermediate value of the true bearing of the aircraft the needle is positioned between the terminals 50, 51 and does not contact either of them.

It is apparent that, when the true bearing of the aircraft attains the value $(\alpha+\beta)_{max}$ the terminal 51 is being contacted by the needle. Consequently, the battery 52 delivers current to the excitation circuit 53 and causes the armature 54 to rotate and to impart to the rudder 55 a motion which will cause the needle of 23 to resume its neutral position between the terminals 50, 51 and to break the contact with the terminal 51.

On the other hand when the true bearing of the aircraft attains the value $(\alpha+\beta)_{min}$ the terminal 50 is being contacted by the needle. Consequently, the battery 52 delivers current to the excitation circuit 56 and causes the motor 54 to rotate in the direction opposite to the one referred to in the preceding paragraph. This imparts to the rudder 55 a motion which causes the needle of 23 to resume its neutral position between the terminals 50, 51 and to break the contact with the terminal 50.

It is, therefore, apparent that the direction of flight of the aircraft will be corrected in the event that the aircraft should tend to drift from the predetermined course because of the corrective movement imparted to the rudder 55.

I claim:

1. In a navigational device carried by a mobile craft for indicating the position of said craft with respect to its surroundings, means positioned in a definite relation to the longitudinal axis of said craft and responsive to incoming radio waves in the neighborhood of said craft for producing a current representing the angular value of the direction of said incoming radio waves with reference to said longitudinal axis, said current being independent of the intensity of said waves and increasing in magnitude with said angular value, a second means positioned in a definite relation to the longitudinal axis of the craft and comprising a compass in which a movable member is orientable so as to assume a fixed orientation with respect to the earth, said second means producing a signal representing the orientation of said member with reference to said longitudinal axis, and means responsive to said current and to said signal for producing an indication representing the position of the craft with respect to its surroundings.

2. In a navigational device carried by a mobile craft for indicating the position of said craft with respect to its surroundings, means positioned in a definite relation to the longitudinal axis of said craft and responsive to incoming radio waves in the neighborhood of said craft for producing a signal representing the angular value of the direction of said incoming radio waves with reference to said longitudinal axis, a second means positioned in a definite relation to the longitudinal axis of the craft and comprising a compass in which a movable member is orientable so as to assume a fixed orientation with respect to the earth, the said second means producing an electrical current representing the angular value of the orientation of said member with reference to said longitudinal axis, said electrical current increasing in magnitude with said angular value, and means responsive to said signal and to said electrical current for producing an indication representing the position of the craft with respect to its surroundings.

3. In a navigational device carried by a mobile craft for indicating the position of said craft with respect to its surroundings, means positioned in a definite relation to the longitudinal axis of said craft and responsive to incoming radio waves in the neighborhood of said craft for producing a current representing the angular value of the direction of said incoming radio waves with reference to said longitudinal axis, said currents being independent of the intensity of said waves and increasing in magnitude with said angular value, a second means positioned in a definite relation to the longitudinal axis of the craft and comprising a compass in which a movable member is orientable so as to assume a fixed orientation with respect to the earth, the said second means producing another current representing the orientation of said member with reference to said longitudinal axis, and means responsive to said currents for producing a resultant current, and means connected to said last means and utilizing said resultant current to provide an indication of the position of said craft with respect to said surroundings.

4. In a navigational device carried by a mobile craft for producing an indication of incoming radio waves with reference to an orientation fixed with respect to the earth, means positioned in a definite relation to the longitudinal axis of said craft and responsive to incoming radio waves in the neighborhood of said craft for producing currents representing the angular value of the direction of said incoming waves with reference to said longitudinal axis, said currents being independent of the intensity of said waves and increasing in magnitude with said angular value, a second means positioned in a definite relation to the longitudinal axis of the craft and comprising a compass in which a movable member is orientable so as to assume a fixed orientation with respect to the earth, the said second means producing signals representing the motion of said member with respect to said longitudinal axis, means responsive to the first said currents and to said signals for producing a resultant signal representing a relationship therebetween, a graduated scale mounted upon the craft in a fixed relationship to its longitudinal axis, a movable pointer in cooperative engagement with said scale, and means responsive to said resultant signal for varying the position of said pointer with respect to said scale in order to indicate a graduation representing the direction of said incoming radio waves with reference to an orientation fixed with respect to the earth.

5. In a navigational device carried by a mobile craft for producing an indication of incoming radio waves with reference to an orientation fixed with respect to the earth, means positioned in a definite relation to the longitudinal axis of said craft and responsive to incoming radio waves in the neighborhood of said craft for producing a signal representing the angular value of the direction of said incoming waves with reference to said longitudinal axis, a second means positioned in a definite relation to the longitudinal axis of the craft and comprising a compass in which a movable member is orientable so as to assume a fixed orientation with respect to the earth, the said second means producing an electrical current representing the angular value of the orientation of said member with respect to said longitudinal axis, said electrical current increasing in magnitude with said angular value, means responsive to said signal and to said electrical current for producing a resultant signal representing a relationship between the first said signal and said electrical current, a graduated scale mounted upon the craft in a fixed relationship to its longitudinal axis, a movable pointer in cooperative engagement with said scale, and means responsive to said resultant signal for varying the position of said pointer with respect to said scale in order to indicate a graduation representing the direction of said incoming radio waves with reference to an orientation fixed with respect to the earth.

6. In a navigational device carried by a mobile craft for producing an indication of incoming radio waves with reference to an orientation fixed with respect to the earth, means positioned in a definite relation to the longitudinal axis of said craft and responsive to incoming radio waves in the neighborhood of said craft for producing currents representing the angular value of the direction of said incoming waves with reference to said longitudinal axis, said currents being independent of the intensity of said waves and increasing in magnitude with said angular value, a second means positioned in a definite relation to the longitudinal axis of the craft and comprising a compass in which a movable member is orientable so as to assume a fixed orientation with respect to the earth, the said second means producing an electrical current representing the angular value of the orientation of said member with respect to said longitudinal axis, said electrical current increasing in magnitude with said angular value, means responsive to said currents and to the second said current for producing a resultant current representing a relationship therebetween, a graduated scale mounted upon the craft in a fixed relationship to its longitudinal axis, a movable pointer in cooperative engagement with said scale, and means responsive to said resultant current for varying the position of said pointer with respect to said scale in order to indicate a graduation representing the direction of said incoming radio waves with reference to an orientation fixed with respect to the earth.

JACOB NEUFELD.